(12) United States Patent
Zhang (10) Patent No.: US 8,650,364 B2
(45) Date of Patent: Feb. 11, 2014

(54) PROCESSING SYSTEM WITH LINKED-LIST BASED PREFETCH BUFFER AND METHODS FOR USE THEREWITH

(75) Inventor: Jing Zhang, Toronto (CA)

(73) Assignee: ViXS Systems, Inc., Toronto, Ontario (CA)

( * ) Notice: Subject to any disclaimer, the term of this patent is extended or adjusted under 35 U.S.C. 154(b) by 682 days.

(21) Appl. No.: 12/128,596

(22) Filed: May 28, 2008

(65) Prior Publication Data

US 2009/0300320 A1 Dec. 3, 2009

(51) Int. Cl.
*G06F 12/00* (2006.01)

(52) U.S. Cl.
USPC ............ 711/137; 711/213; 712/207; 712/237

(58) Field of Classification Search
None
See application file for complete search history.

(56) References Cited

U.S. PATENT DOCUMENTS

| | | | | |
|---|---|---|---|---|
| 5,555,392 | A * | 9/1996 | Chaput et al. | 711/118 |
| 6,288,730 | B1 * | 9/2001 | Duluk et al. | 345/552 |
| 2005/0289301 | A1 * | 12/2005 | Woo et al. | 711/137 |
| 2007/0061379 | A1 * | 3/2007 | Wong et al. | 707/201 |
| 2007/0294482 | A1 * | 12/2007 | Kadambi et al. | 711/137 |
| 2008/0168259 | A1 * | 7/2008 | Biran et al. | 712/207 |

* cited by examiner

*Primary Examiner* — Matthew Bradley
*Assistant Examiner* — Alan Otto
(74) *Attorney, Agent, or Firm* — Garlick & Markison; Bruce E. Stuckman

(57) ABSTRACT

A processing device includes a memory and a processor that generates a plurality of read commands for reading read data from the memory and a plurality of write commands for writing write data to the memory. A prefetch memory interface prefetches prefetch data to a prefetch buffer, retrieves the read data from the prefetch buffer when the read data is included in the prefetch buffer, and retrieves the read data from the memory when the read data is not included in the prefetch buffer, wherein the prefetch buffer is managed via a linked list.

21 Claims, 12 Drawing Sheets

Prefetch memory processing system 75

FIG. 4

Prefetch memory processing system 75

Video encoding operation

FIG. 12

Video decoding operation

PROCESSING SYSTEM WITH LINKED-LIST BASED PREFETCH BUFFER AND METHODS FOR USE THEREWITH

CROSS REFERENCE TO RELATED PATENTS

Not applicable

TECHNICAL FIELD OF THE INVENTION

The present invention relates to processing systems used in such systems as video processing systems and prefetch memory interfaces used therein.

DESCRIPTION OF RELATED ART

In modern digital systems with embedded processors, memory system latency can significantly impact the performance of the processor. For instance, larger memory system latency can cause the expenditure of useless idle cycles while needed data is being fetched from the memory. This issue is especially serious in the many System On a Chip (SOC) designs for several reasons. With an increasingly large number of functional units in an SOC, the latency to access a memory system shared among the functional units is vastly increased. In addition, advances in processor architectures and SOC fabrication processes have raised processor clock frequencies, increasing the need for faster memory access times. Further, larger amounts of data need to be read in many applications such as video or multi-media applications to achieve the higher resolutions that are becoming more common.

Prefetch is a technique that counteracts the above mentioned issue by predicting what kind of data the processor is going to need in the near future, fetching the data before it is really needed, and storing it in a local buffer where the processor can access it very quickly. Many prefetch implementations use a linearly addressed "stream buffer". However, in many circumstances this leads to inefficient buffer use and does not necessarily improve the system performance.

Further limitations and disadvantages of conventional and traditional approaches will become apparent to one of ordinary skill in the art through comparison of such systems with the present invention.

DETAILED DESCRIPTION OF THE INVENTION INCLUDING THE PRESENTLY PREFERRED EMBODIMENTS

Figures 1, 2, 3:
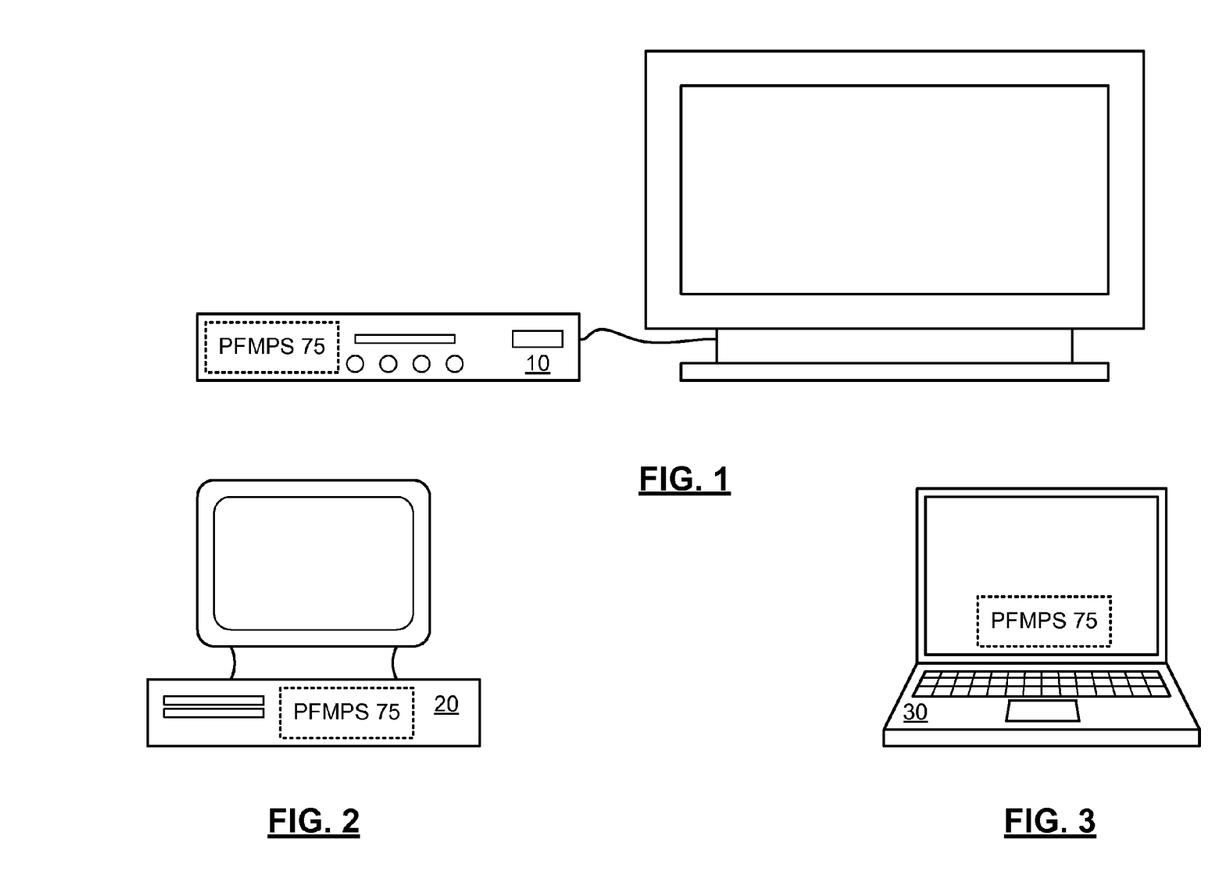
FIGS. 1-3 present pictorial diagram representations of various devices in accordance with embodiments of the present invention.

FIGS. 1-3 present pictorial diagram representations of various devices in accordance with embodiments of the present invention. In particular, set top box 10 with built-in digital video recorder functionality or a stand alone digital video recorder, computer 20 and portable computer 30 illustrate electronic devices that incorporate a prefetch memory processing system 75 that includes one or more features or functions of the present invention. While these particular devices are illustrated, the prefetch memory processing system 75 of the present invention can be implemented in a host of electronic systems, such as those that include a system on a chip or otherwise include a prefetch memory interface. Further details regarding such prefetch memory processing systems including several optional functions and features will be described in conjunction with FIGS. 4-15 and the appended claims.

Figure 4:
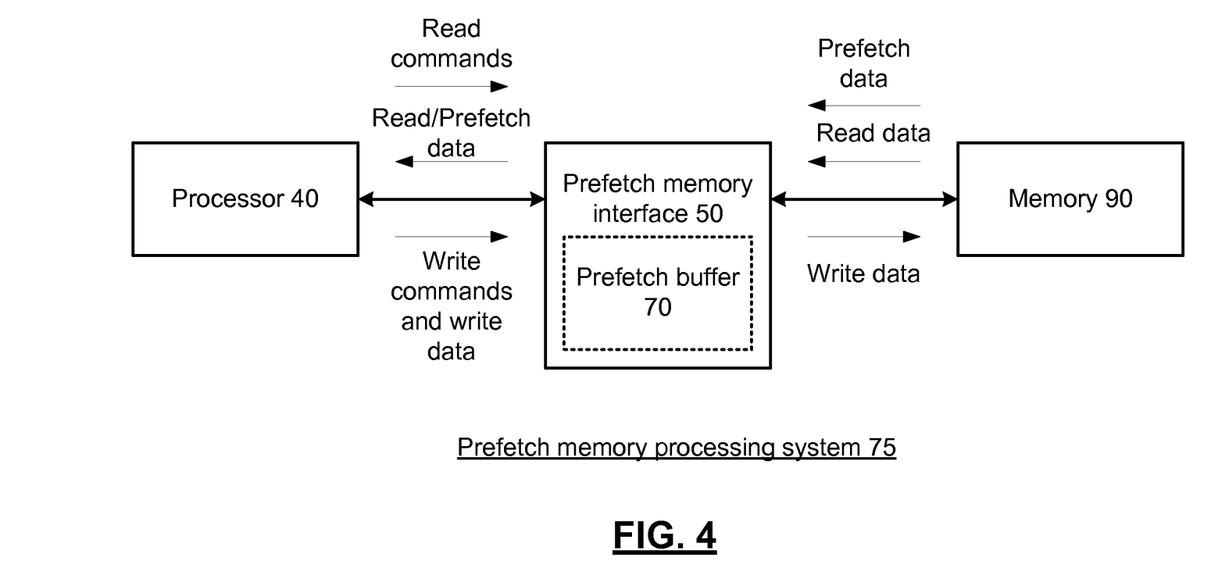
FIG. 4 presents a block diagram representation of a prefetch memory processing system 75 in accordance with an embodiment of the present invention.

FIG. 4 presents a block diagram representation of a prefetch memory processing system 75 in accordance with an embodiment of the present invention. In particular, prefetch memory processing system 75 includes a processor 40, prefetch memory interface 50 and memory 90.

Processor 40 can be implemented using a single processing device or a plurality of processing devices. Such a processing device may be a microprocessor, co-processors, a microcontroller, digital signal processor, microcomputer, central processing unit, field programmable gate array, programmable logic device, state machine, logic circuitry, analog circuitry, digital circuitry, and/or any device that manipulates signals (analog and/or digital) based on data that are stored in a memory module 90 and operational instructions that are stored in memory 90 or other memory device. Memory 90 may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Processor 40 generates a plurality of read commands for reading read data from the memory 90 and a plurality of write commands for writing write data to the memory 90. Prefetch memory interface 50 tries to predict what kind of read data the processor 40 is going to need in the near future from memory 90, fetching the read data before it is really needed, and storing it in a prefetch buffer 70 where the processor 40 can access it very quickly. Prefetch memory interface 50 prefetches prefetch data to a prefetch buffer 70.

When a read command is issued by processor 40, prefetch memory interface 50 checks to see if the read data has already been stored as prefetch data in the prefetch buffer 70. Prefetch memory interface 50 retrieves the read data from the prefetch buffer 70 when the read data is included in the prefetch buffer 70. Otherwise, prefetch memory interface 50, retrieves the read data from the memory. Further, in order to maintain data consistency, when processor 40 issues a write command, prefetch memory interface 50 checks to see if the write data is replacing read data that is stored as prefetch data in the prefetch buffer 70. If so, the prefetch memory interface 50 erases the prefetch data in the prefetch buffer 70, and writes the write data to the memory.

In an embodiment of the present invention, the prefetch buffer 70 is managed via a linked list. In particular, prefetch buffer 70 includes a plurality of entries that include the prefetch data being buffered. These entries are linked together via the linked list for more efficient operation. In particular, when individual entries are hit by a read command, these entries can be released from the buffer individually. In a similar fashion, when individual entries are hit by a write command, these entries can be returned to free space on an individual basis. Further details regarding implementations of prefetch memory interface 50 including several optional functions and features are described in conjunction with FIGS. 5-8 that follow.

Figure 5:
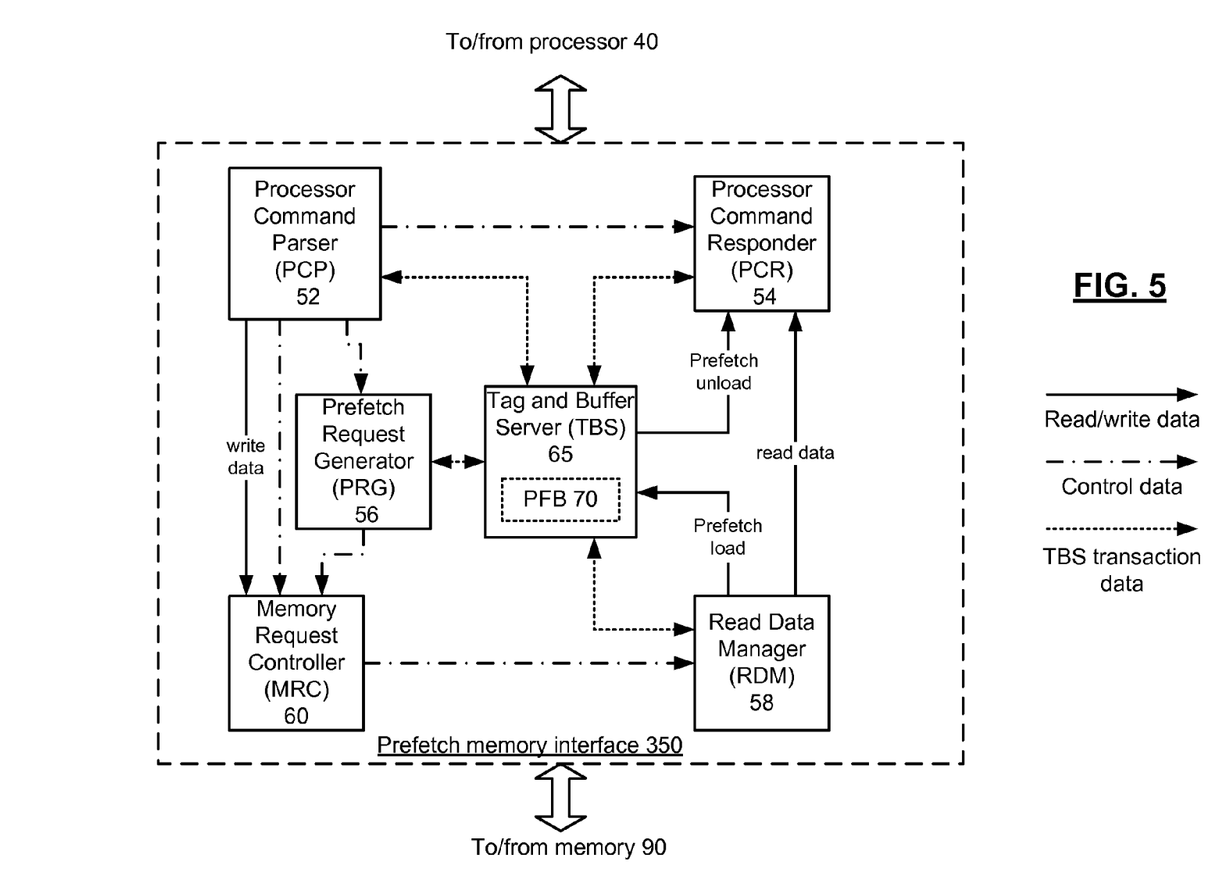
FIG. 5 presents a block diagram representation of a prefetch memory interface 50 in accordance with an embodiment of the present invention.

FIG. 5 presents a block diagram representation of a prefetch memory interface 50 in accordance with an embodiment of the present invention. In particular a prefetch memory interface 350 is shown that can implement prefetch memory interface 50. Prefetch memory interface 350 includes a processor command parser (PCP) 52, a processor command responder (PCR) 54, a prefetch request generator (PRG) 56, a tag and buffer server (TBS) 65 that includes the prefetch buffer (PFB) 70, a memory request controller (MRC) 60 and a read data manager (RDM) 58. As shown, different line patterns are used to represent paths for read/write data, TBS transaction data, and other control data.

Processor command parser 52 checks read and write commands from the processor 40 to determine if they correspond to cached/prefetched data, or a non-cached/non-prefetched data. In particular, PCP 52 queries the TBS 65 to determine whether it "hits" the prefetch buffer 70, meaning that the data requested by the read command corresponds to data that has already been prefetched and stored in the prefetch buffer 70. For a write command, PCP 52 queries the TBS 65 to check if the data to be written has been prefetched and thus needs to be erased or otherwise invalidated or discarded. Relevant information about a read/write request will also be directed to PRG 56 and PCR 54. Write commands and write data are forwarded to the memory request controller 60. Non-cached read commands are likewise forwarded to the MRC 60. Additional read write control policy could be implemented inside PCP 52. In particular, PCP 52 can be configured to check the availability of prefetch data only when the read command intends to fill a cache line inside the processor 40, and directly forwards the read request to MRC 60 otherwise.

The memory request controller 60 and read data manager 58 respond to read commands, where the data to be read has not been prefetched, by retrieving the data from the memory 90. In particular, MRC 60 and RDM 58 interface with the memory 90 via a memory interface protocol to read the read data from the memory 90 and to move the read data to the processor command responder 54. The MRC 60 and RDM 58 also respond to prefetch requests generated by prefetch request generator 56 to retrieve prefetch data from memory 90 to be loaded in the prefetch buffer 70. The MRC 60 also interfaces with the memory 90 to write back data when a write operation is passed from PCP 52.

The processor command responder 54 generates responses to the processor's read and write commands. In particular, for read commands, PCR 54 provides prefetch data unloaded from the tag and buffer server 65 when possible. Otherwise, PCR 54 provides read data from the RDM 58.

Prefetch generator 56 generates prefetch requests based on the information passed from PCP 52 and queue status obtained from MRC 60 and TBS 65. For each read request issued from the processor 40 and passed from PCP 52, prefetch requests could be generated in the following two steps:

Step 1: Generation of potential prefetch requests. The potential prefetch requests are generated based on the following conditions: whether a read command was a "hit" corresponding to prefetched data stored in the prefetch buffer 70 or was a "non-hit"; the queue status obtained from MRC 60 and TBS 65; and the target address range of the read request. In particular, a read command generates a "prefetch window", i.e. a number j, of potential prefetch requests. Configurable address offsets are assigned to each window slot. For instance, address offsets of "+1 +2 . . . +j" assigned to slot 1,2,3 result in data addresses of addr+1, addr+2, . . . addr+j as potential prefetch targets, where "addr" is the address of the original read data requested by the processor. For different target address ranges, different address offsets could be configured and so different prefetch profiles are used.

In an embodiment of the present invention, a non-hit read is assigned a narrower window (smaller j) since it may be the start for a new stream, while a hit read is assigned a wider window (larger j) since a prior prefetch was successful. In addition, the value of j can be adjusted based on current utilization of the prefetch buffer 70. In particular, larger windows can be used when the size of the unused portion of the prefetch buffer 70 is above a threshold. Further, the window size j can be adjusted based on the number read requests in queue with the MRC 60, with the value of j decreased when the queue size is above a utilization threshold.

Step 2: Generation of final memory requests. After PFG 56 has calculated the addresses for the potential prefetch targets, it checks these addresses against all entries inside the prefetch buffer 70. If a potential prefetch target corresponds to data that is already stored in the prefetch buffer 70, it is discarded; besides if a potential prefetch target matches the address of any free entry inside the prefetch buffer 70, it is also discarded because the intended data has been recently prefetched and returned to the processor 40 and so is less likely to be requested again in the near future. Otherwise, a prefetch request is generated to MRC 60.

Tag and buffer server 65 manages the prefetch buffer 70 and otherwise coordinates with the PCP 52, PRG 56, RDM 58, and PCR 54, via an exchange of TBS transaction data to determine if a read request is a hit or non-hit, to provide prefetch buffer utilization feedback to the PRG 56, and to load and unload prefetch data. In addition, TBS 65 can periodically issue a forced invalidation of entries in the prefetch buffer 70 to purge the prefetch buffer 70 of the oldest prefetch data that has not been used while the prefetch buffer 70 is above a utilization threshold, or otherwise force the release of the entry when the prefetch buffer 70 becomes full and a new prefetch request is generated. Further details regarding the management and structure of the prefetch buffer 70, including an example implementation, is presented in conjunction with FIGS. 6-8 that follow.

Figure 6:
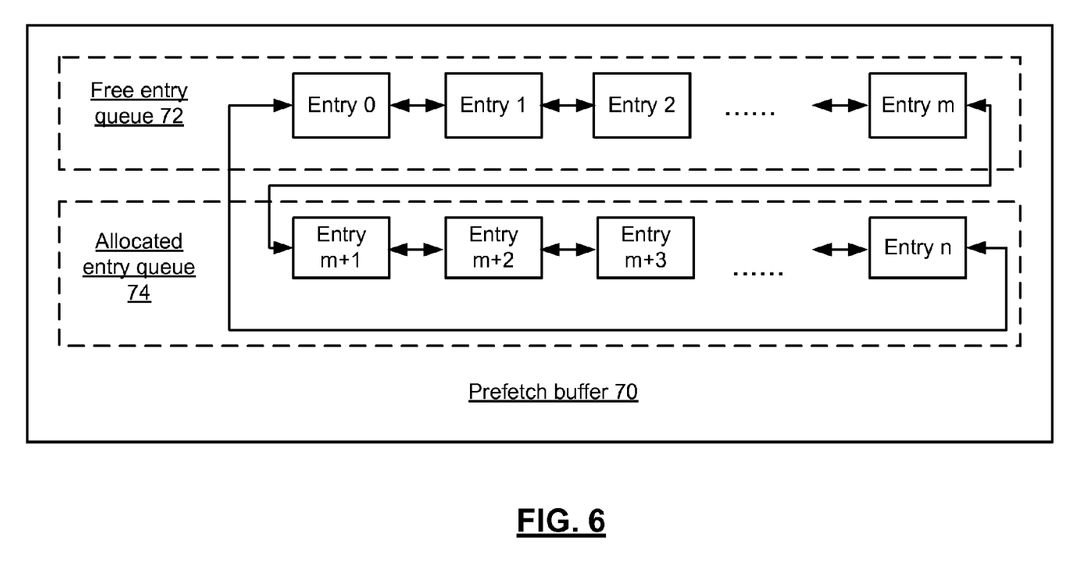
FIG. 6 presents a block diagram representation of a prefetch buffer 70 in accordance with an embodiment of the present invention.

FIG. 6 presents a block diagram representation of a prefetch buffer 70 in accordance with an embodiment of the present invention. In particular, prefetch buffer 70 has n+m entries that are divided into a set of n allocated entries in an allocated entry queue 74 and a set of m free entries in a free entry queue 72. Allocated entries are entries that either contain prefetch data or that are in the process of loading, unloading, etc. Free entries are data locations that are free to be loaded with new prefetch data. Each entry includes a record having address and status information relating to prefetch data contained in the entry (if any). In addition, the record contains a pointer to the next entry in the linked list. In an embodiment of the present invention, the record can also contain a pointer to the previous entry in the linked list allowing both a dual (forward and backward) linked list structure. In an embodiment of the present invention, each entry is of equal size and can contain a fixed amount of data, i.e. a cache line of processor 40, however, entries of unequal size could otherwise be implemented with a more complicated queue management function.

Figure 7:
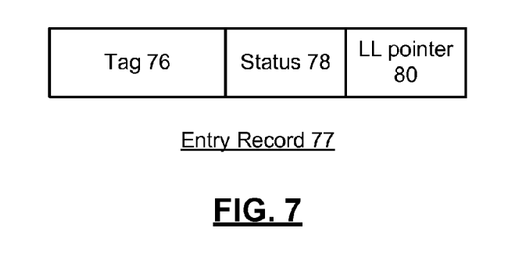
FIG. 7 presents a block diagram representation of a record in accordance with an embodiment of the present invention.

FIG. 7 presents a block diagram representation of an entry record in accordance with an embodiment of the present invention. As discussed in conjunction with FIG. 6, each entry in the linked list includes an entry record 77 that contains a tag field 76 that indicates the identity of the data stored on the entry (if any) such as via the original address in memory 90 or other indication. The entry record 77 further contains the linked list pointer or pointers 80. In addition, a status field 78 that indicates the prefetch status of the entry. For instance, the entry record 77 status field can contain a data field that indicates one of the prefetch conditions/states shown in Table 1 that follows.

TABLE 1

Entry Status Conditions

| Condition | Description |
| --- | --- |
| FREE | An entry that is not in another status, an unallocated entry. |
| LDPD | Load pending - a line has been allocated for a prefetch, however the prefetched data has not yet been loaded from memory 90. |
| LOADED | An entry where the prefetched data has been loaded, but no hit has occurred yet. |
| LDPD_ULPD | Load pending and unload pending: prefetched data has not been loaded yet, but a hit has already occurred |
| ULPD | Unload pending - a prefetched line has been loaded and hit has happened on it, but the data has not been unloaded yet (i.e. data not yet returned to the processor 40). |
| CANCEL_LD | Cancel load - load into the entry has not happened yet but it is already cancelled due to write hit or forced invalidation |

Figure 8:
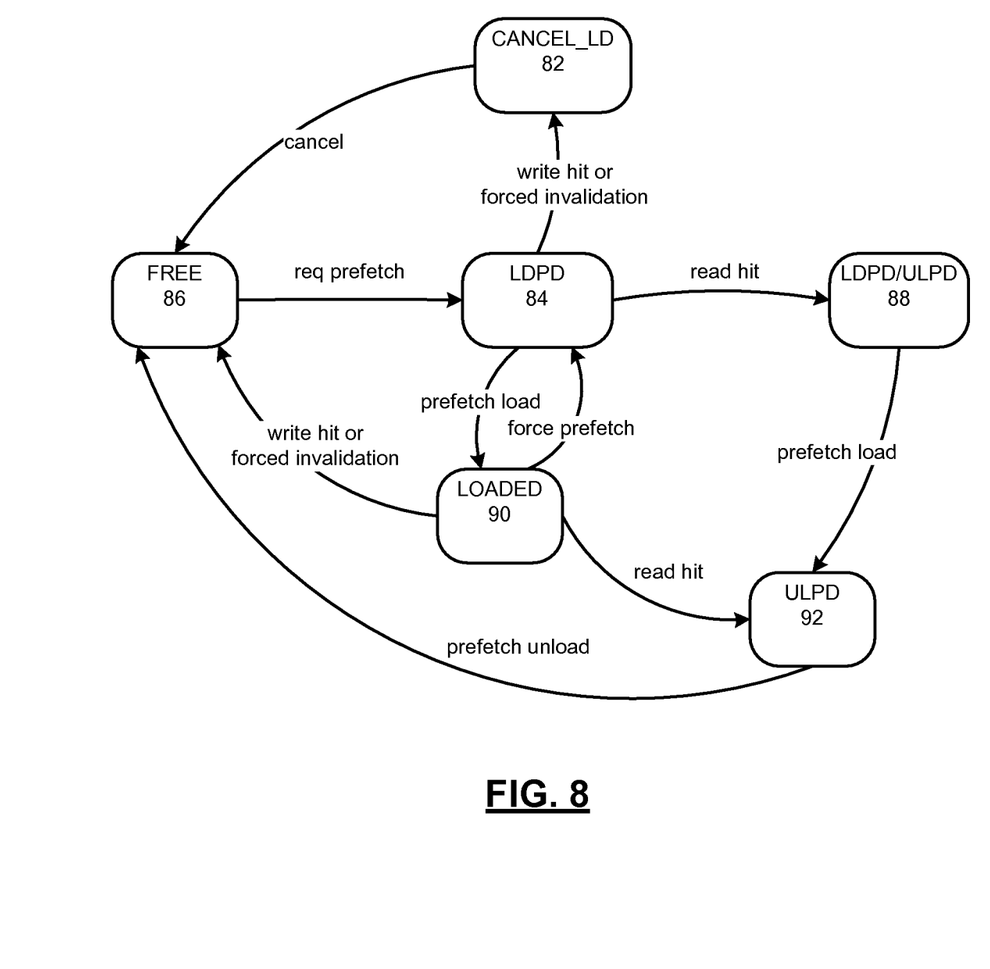
FIG. 8 presents a state diagram representation corresponding to a record in accordance with an embodiment of the present invention.

FIG. 8 presents a state diagram representation corresponding to an entry in accordance with an embodiment of the present invention. The FREE state 86 can be entered by a cancelled prefetch load from CANCEL_LD state 82, after a write hit or forced invalidate for LOADED state 90, or after prefetch data is unloaded from ULPD state 92. The LDPD state 84 can be entered after a prefetch is requested from FREE state 86, from a forced prefetch from LOADED state 90. The LOADED state 90 can be entered after a prefetch load from LDPD state 84. The ULPD state 92 can be entered after a read hit from LOADED state 90 or a prefetch load from LDPD_ULPD state 88. LDPD_ULPD state 88 can be entered after a read hit from LDPD state 84. CANCEL_LD state 82 can be entered based on a write hot or forced invalidation from LDPD state 84

In particular, the operation of prefetch memory interface 350 can be illustrated in conjunction with an example state transition. Upon system reset, all entries reside in the free entry queue (FEQ) 72 and are in FREE state 86. When prefetch request generator 56 decides to generate a prefetch, it always takes an entry from the head of the free entry queue 72, changing its status to LDPD and putting it into the end of the allocated entry queue 74 by adjusting the linked list pointer or pointers. When the prefetched data has been written into the prefetch buffer 70, this status of this entry is changed to LOADED. When a "hit" happens and the processor command parser 52 queries the tag and buffer server 65 to read this entry, its status will change to ULPD and eventually to FREE again. After it becomes FREE, the record will be moved from wherever it is inside the allocated entry queue 74 to the end of the free entry queue 72 by adjusting the linked list pointer or pointers.

The relationship between tag and buffer server 65 and the other blocks of prefetch memory interface 350 can be based on a client-server model. To guarantee data consistency, mutual exclusive access is provided by allowing only one client with potential state-changing requests to access the TBS 65 at a time. Each client will have exclusive access for a series of related requests, namely an atomic command session, when access is granted. For instance, PCP 52 may be granted exclusive access to query a read data address and then reserve unloading the data if the query hits.

Overall, the centralized management of prefetch buffer 70 described above has several benefits. When a write command from the processor hits the tag and buffer server 65, only the hit entry is invalidated and not other entries. When a read command hits, after the prefetch data is unloaded, the TBS 65 releases and only releases the hit record, no matter where inside the AEQ 74 the record occurs. If the FEQ 72 is empty when a prefetch has to be issued, the head of AEQ 74 is forced to be released provided its status is either LDPD or LOADED. Since head of AEQ 74 is older than other entries inside AEQ 74, this means equivalently a FIFO stall entry replacement algorithm is used. By configuration of the window variable j, TBS 65 can emulate either a linear stream buffer, a stride buffer or a mixture thereof.

Further, when a series of adjacent lines are hit and retrieved, only an unloaded entry inside AEQ 74 is released; other loaded entries are potential hit targets for a future read. Thus performance is not hurt no matter how the processor 40 issues requests in a "neighborhood", whereas in many other prefetch queue management schemes the prefetched data is un-necessarily released due to a sequential access limit. Since the tag field 76 inside both the FEQ 72 and the AEQ 74 can be used by PRG 56 to check if a potential prefetch target has been prefetched recently, over prefetch is greatly reduced.

As can be seen, the processing of individual read/write commands can happen in parallel. To manage resource conflicts, the TBS 65 serves as a central portal to manage state transitions, thus reducing the complexity of parallel processing. The mutual exclusive access mechanism pf TBS 65 also helps to implement a robust system.

Figure 9:
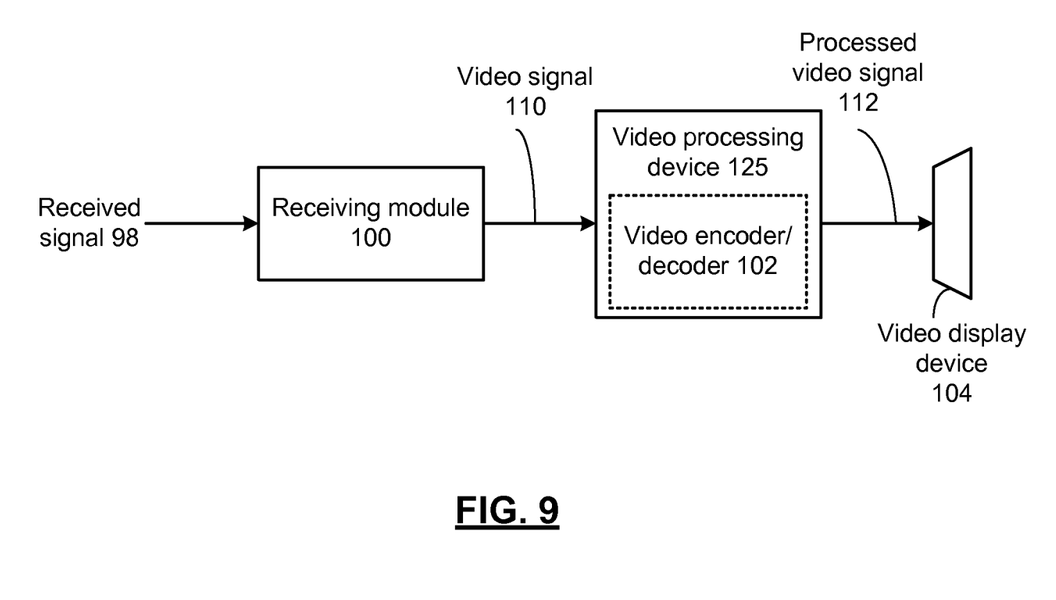
FIG. 9 presents a block diagram representation of a video device in accordance with an embodiment of the present invention.

FIG. 9 presents a block diagram representation of a video device in accordance with an embodiment of the present invention. In particular, this video device includes a receiving module 100, such as a television receiver, cable television receiver, satellite broadcast receiver, broadband modem, 3G transceiver or other information receiver or transceiver that is capable of receiving a received signal 98 and extracting one or more video signals 110 via time division demultiplexing, frequency division demultiplexing or other demultiplexing technique. Video processing device 125 includes video encoder/decoder 102 and is coupled to the receiving module 100 to encode, decode or transcode the video signal for storage, editing, and/or playback in a format corresponding to video display device 104.

In accordance with the present invention, the video encoder/decoder 102 operates in an encoding mode when a mode selection signal has a first value and operates in a decoding mode when the mode selection signal has a second value. The video encoder/decoder 102 includes one or more shared modules that function in both encoding and decoding modes. Further video encoder/decoder 102 includes prefetch memory processing system 75 as previously described.

In an embodiment of the present invention, the received signal 98 is a broadcast video signal, such as a television signal, high definition television signal, enhanced definition television signal or other broadcast video signal that has been transmitted over a wireless medium, either directly or through one or more satellites or other relay stations or through a cable network, optical network or other transmission network. In addition, received signal 98 can be generated from a stored video file, played back from a recording medium such as a magnetic tape, magnetic disk or optical disk, and can include a streaming video signal that is transmitted over a public or private network such as a local area network, wide area network, metropolitan area network or the Internet.

Video signal 110 can include an analog video signal that is formatted in any of a number of video formats including National Television Systems Committee (NTSC), Phase Alternating Line (PAL) or Sequentiel Couleur Avec Memoire (SECAM). Processed video signal 112 can include a digital video signal complying with a digital video codec standard such as H.264, MPEG-4 Part 10 Advanced Video Coding (AVC) or another digital format such as a Motion Picture Experts Group (MPEG) format (such as MPEG1, MPEG2 or MPEG4), Quicktime format, Real Media format, Windows Media Video (WMV) or Audio Video Interleave (AVI), etc.

Video display devices 104 can include a television, monitor, computer, handheld device or other video display device that creates an optical image stream either directly or indirectly, such as by projection, based on decoding the processed video signal 112 either as a streaming video signal or by playback of a stored digital video file.

Figure 10:
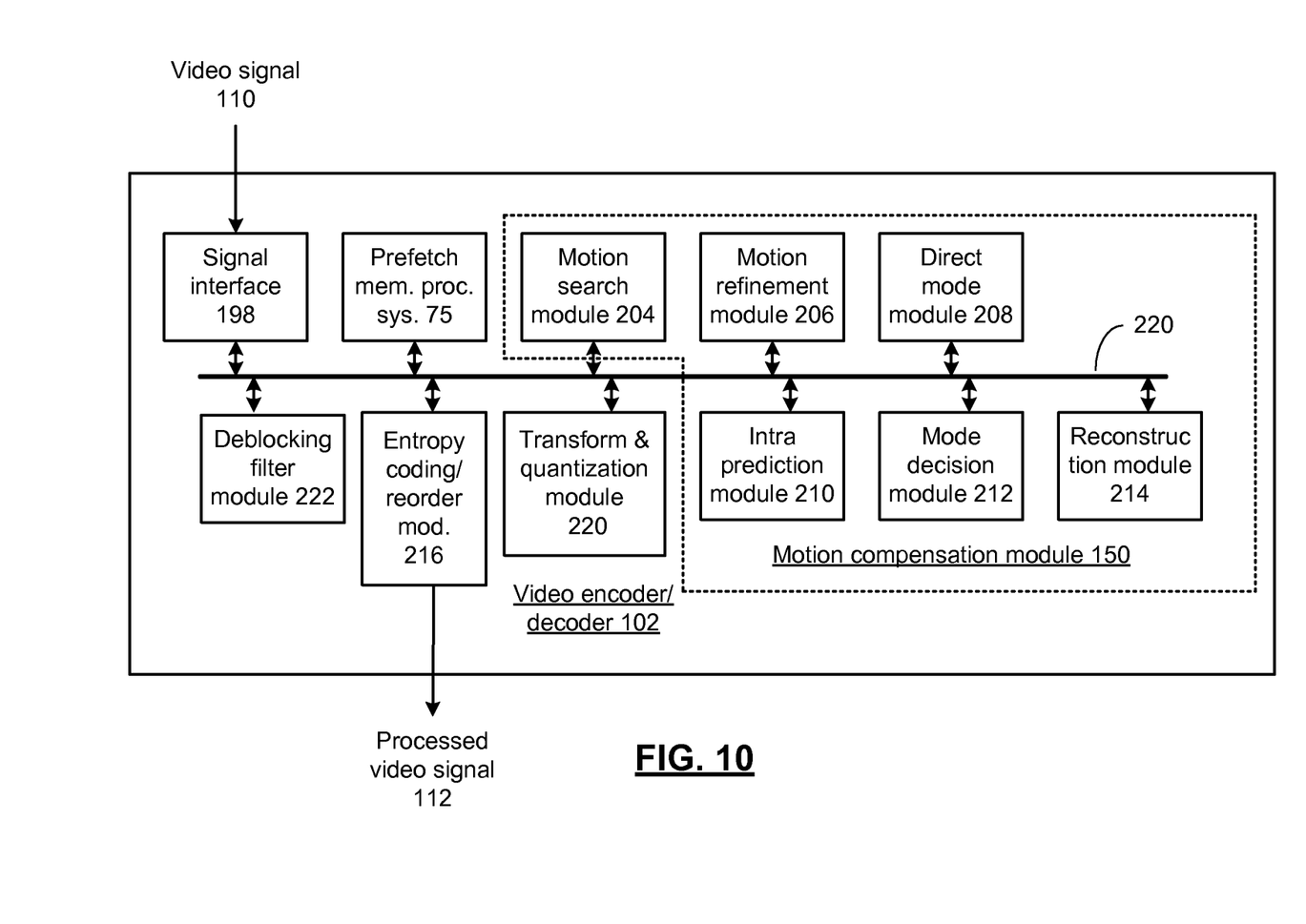
FIG. 10 presents a block diagram representation of a video encoder/decoder 102 in accordance with an embodiment of the present invention.

FIG. 10 presents a block diagram representation of a video encoder/decoder 102 in accordance with an embodiment of the present invention. In particular, video encoder/decoder 102 can be a video codec that operates in accordance with many of the functions and features of the H.264 standard, the MPEG-4 standard, VC-1 (SMPTE standard 421M) or other standard, to process processed video signal 112 to encode, decode or transcode video input signal 110. Video input signal 110 is optionally formatted by signal interface 198 for encoding, decoding or transcoding by video encoder/decoder 102.

Prefetch memory processing system 75 is coupled, via bus 221, to the signal interface 198 and a plurality of other modules, such as motion search module 204, motion refinement module 206, direct mode module 208, intra-prediction module 210, mode decision module 212, reconstruction module 214, entropy coding/reorder module 216, neighbor management module 218, forward transform and quantization module 220 and deblocking filter module 222. The modules of video encoder/decoder 102 can be implemented in software or firmware and be structured as operations performed by prefetch memory processing system 75. Alternatively, one or more of these modules can be implemented using a hardware engine that includes a state machine, analog circuitry, digital circuitry, and/or logic circuitry, and that operates either independently or under the control and/or direction of prefetch memory processing system 75 or one or more of the other modules, depending on the particular implementation. It should also be noted that the software implementations of the present invention can be stored on a tangible storage medium such as a magnetic or optical disk, read-only memory or random access memory and also be produced as an article of manufacture. While a particular bus architecture is shown, alternative architectures using direct connectivity between one or more modules and/or additional busses can likewise be implemented in accordance with the present invention. In conjunction with performing one or more specific functions of video encoder/decoder 102, prefetch memory processing system 75 can optionally be used in the implementation of a memory cache for the processing of data, such as video data.

Video encoder/decoder 102 can operate in various modes of operation that include an encoding mode and a decoding mode that is set by the value of a mode selection signal that may be a user defined parameter, user input, register value, memory value or other signal. In addition, in video encoder/decoder 102, the particular standard used by the encoding or decoding mode to encode or decode the input signal can be determined by a standard selection signal that also may be a user defined parameter, user input, register value, memory value or other signal. In an embodiment of the present invention, the operation of the encoding mode utilizes a plurality of modules that each perform a specific encoding function. The operation of decoding can also utilizes at least one of these plurality of modules to perform a similar function in decoding. In this fashion, modules such as the motion refinement module 206, direct mode module 208, and intra-prediction module 210, mode decision module 212, reconstruction module 214, transformation and quantization module 220, and deblocking filter module 222, can be used in both the encoding and decoding process to save on architectural real estate when video encoder/decoder 102 is implemented on an integrated circuit or to achieve other efficiencies.

While not expressly shown, video encoder/decoder 102 can include a comb filter or other video filter, and/or other module to support the encoding of video input signal 110 into processed video signal 112.

Further details of specific encoding and decoding processes that use these function specific modules will be described in greater detail in conjunction with FIGS. 11 and 12.

Figure 11:
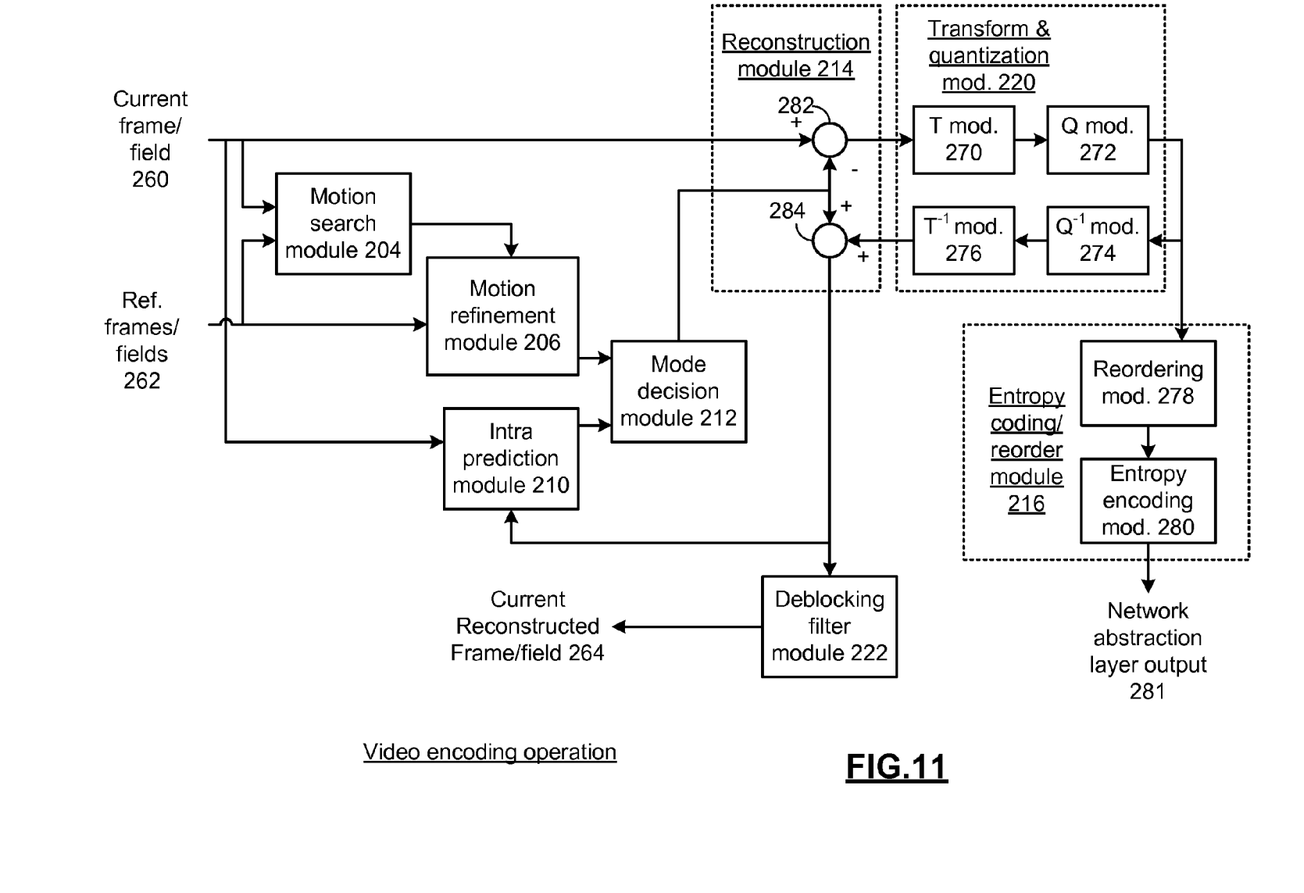
FIG. 11 presents a block flow diagram of a video encoding operation in accordance with an embodiment of the present invention.

FIG. 11 presents a block flow diagram of a video encoding operation in accordance with an embodiment of the present invention. In particular, an example video encoding operation is shown that uses many of the function specific modules described in conjunction with FIG. 5 to implement a similar encoding operation. Motion search module 204 generates a motion search motion vector for each macroblock of a plurality of macroblocks based on a current frame/field 260 and one or more reference frames/fields 262. Motion refinement module 206 generates a refined motion vector for each macroblock of the plurality of macroblocks, based on the motion search motion vector. Intra-prediction module 210 evaluates and chooses a best intra prediction mode for each macroblock of the plurality of macroblocks. Mode decision module 212 determines a final motion vector for each macroblock of the plurality of macroblocks based on costs associated with the refined motion vector, and the best intra prediction mode.

Reconstruction module 214 generates residual pixel values corresponding to the final motion vector for each macroblock of the plurality of macroblocks by subtraction from the pixel values of the current frame/field 260 by difference circuit 282 and generates unfiltered reconstructed frames/fields by re-adding residual pixel values (processed through transform and quantization module 220) using adding circuit 284. The transform and quantization module 220 transforms and quantizes the residual pixel values in transform module 270 and quantization module 272 and re-forms residual pixel values by inverse transforming and dequantization in inverse transform module 276 and dequantization module 274. In addition, the quantized and transformed residual pixel values are reordered by reordering module 278 and entropy encoded by entropy encoding module 280 of entropy coding/reordering module 216 to form network abstraction layer output 281.

Deblocking filter module 222 forms the current reconstructed frames/fields 264 from the unfiltered reconstructed frames/fields. While a deblocking filter is shown, other filter modules such as comb filters or other filter configurations can likewise be used within the broad scope of the present invention. It should also be noted that current reconstructed frames/fields 264 can be buffered to generate reference frames/fields 262 for future current frames/fields 260.

As discussed in conjunction with FIG. 10, one of more of the modules described herein can also be used in the decoding process as will be described further in conjunction with FIG. 12.

Figure 12:
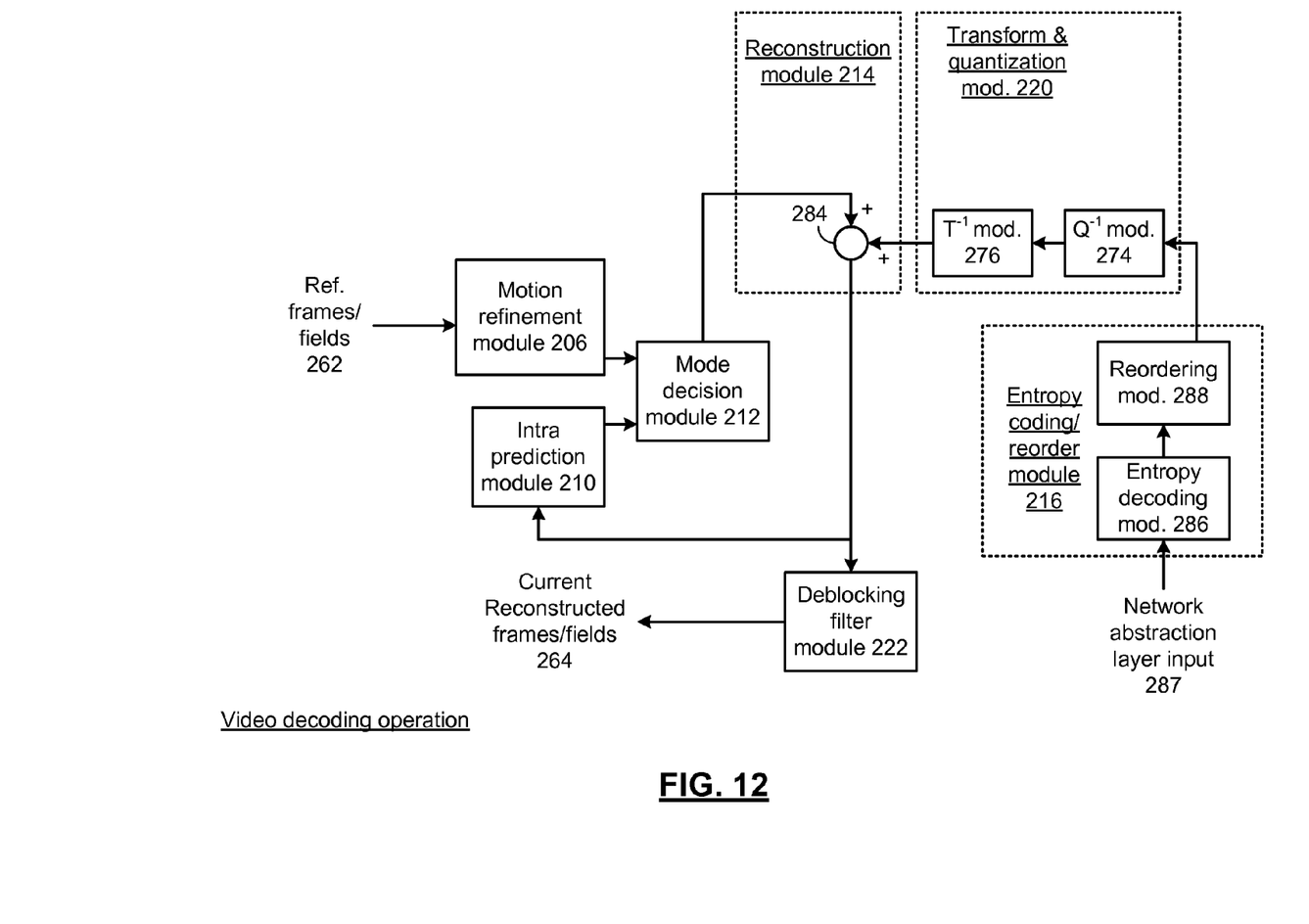
FIG. 12 presents a block flow diagram of a video decoding operation in accordance with an embodiment of the present invention.

FIG. 12 presents a block flow diagram of a video decoding operation in accordance with an embodiment of the present invention. In particular, this video decoding operation contains many common elements described in conjunction with FIG. 11 that are referred to by common reference numerals. In this case, the motion refinement module 206, the intra-prediction module 210, the mode decision module 212, and the deblocking filter module 222 are each used as described in conjunction with FIG. 11 to process reference frames/fields 262. In addition, the reconstruction module 214 reuses the adding circuit 284 and the transform and quantization module reuses the inverse transform module 276 and the inverse quantization module 274. In should be noted that while entropy coding/reorder module 216 is reused, instead of reordering module 278 and entropy encoding module 280 producing the network abstraction layer output 281, network abstraction layer input 287 is processed by entropy decoding module 286 and reordering module 288.

While the reuse of modules, such as particular function specific hardware engines, has been described in conjunction with the specific encoding and decoding operations of FIGS. 11 and 12, the present invention can likewise be similarly employed to the other embodiments of the present invention and/or with other function specific modules used in conjunction with video encoding and decoding.

Figure 13:
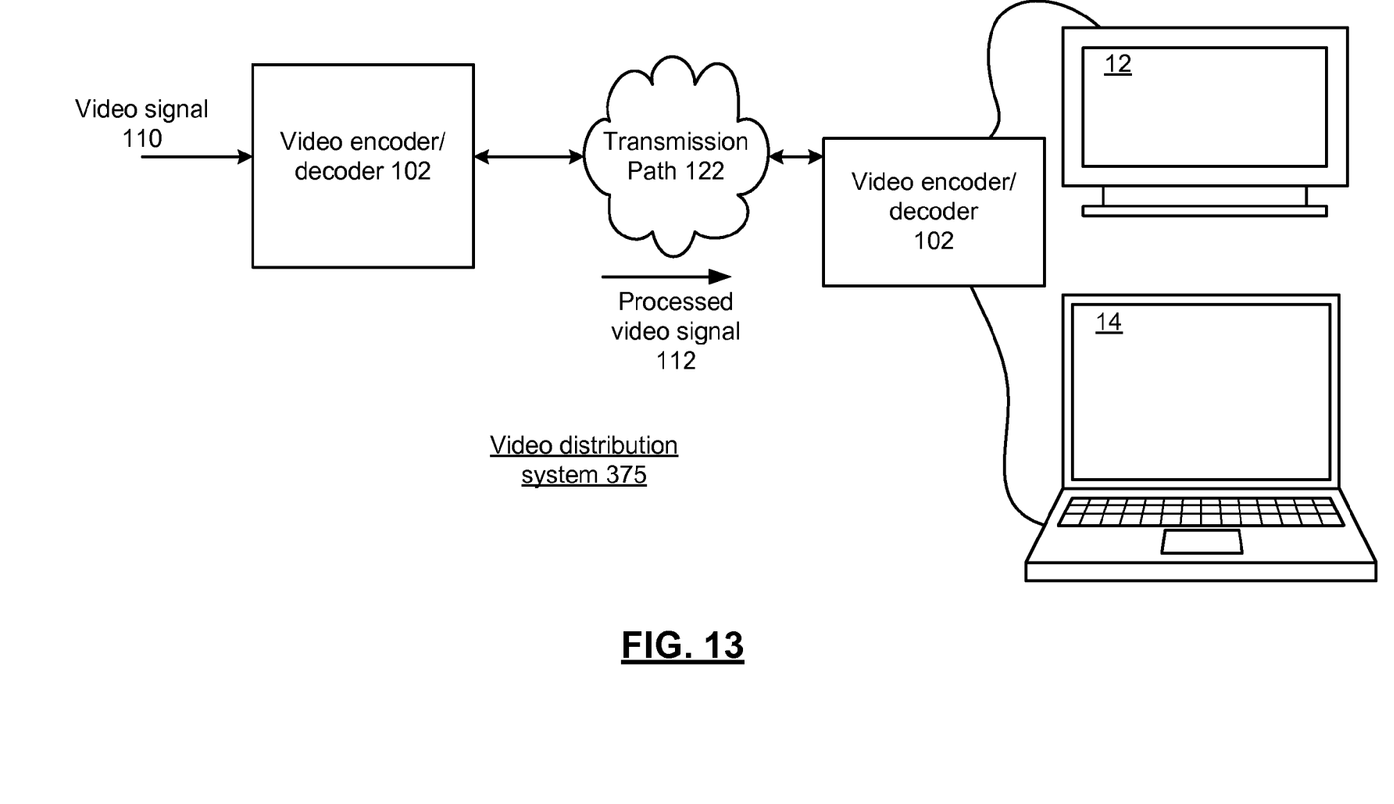
FIG. 13 presents a block diagram representation of a video distribution system 375 in accordance with an embodiment of the present invention.

FIG. 13 presents a block diagram representation of a video distribution system 375 in accordance with an embodiment of the present invention. In particular, processed video signal 112 is transmitted from a first video encoder/decoder 102 via a transmission path 122 to a second video encoder/decoder 102 that operates as a decoder. The second video encoder/decoder 102 operates to decode the processed video signal 112 for display on a display device such as television 10, computer 20 or other display device.

The transmission path 122 can include a wireless path that operates in accordance with a wireless local area network protocol such as an 802.11 protocol, a WIMAX protocol, a Bluetooth protocol, etc. Further, the transmission path can include a wired path that operates in accordance with a wired protocol such as a Universal Serial Bus protocol, an Ethernet protocol or other high speed protocol.

Figure 14:
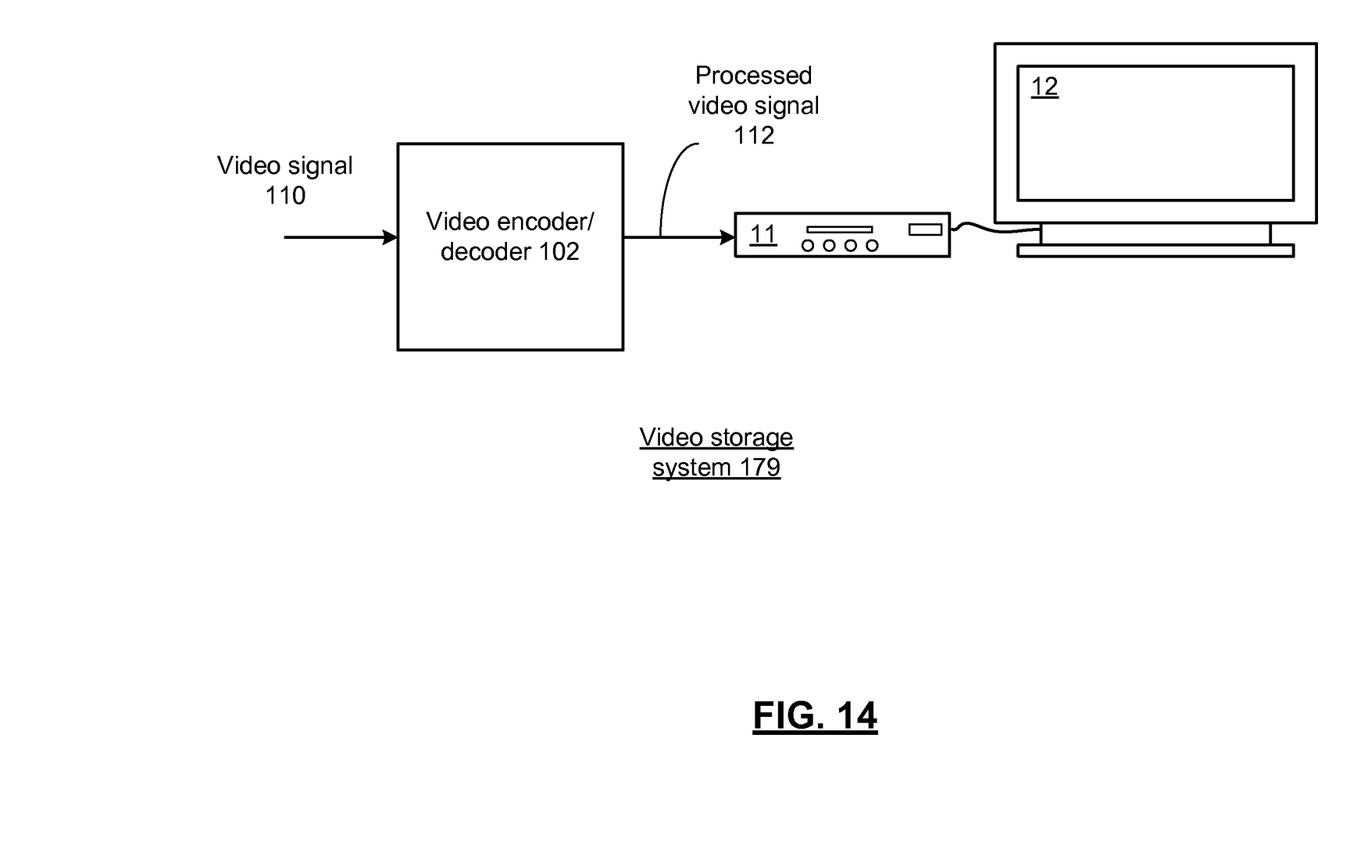
FIG. 14 presents a block diagram representation of a video storage system 179 in accordance with an embodiment of the present invention.

FIG. 14 presents a block diagram representation of a video storage system 179 in accordance with an embodiment of the present invention. In particular, device 11 is a set top box with built-in digital video recorder functionality, a stand alone digital video recorder, a DVD recorder/player or other device that stores the processed video signal 112 for display on video display device such as television 12. While video encoder/decoder 102 is shown as a separate device, it can further be incorporated into device 11. In this configuration, video encoder/decoder 102 can further operate to decode the processed video signal 112 when retrieved from storage to generate a video signal in a format that is suitable for display by video display device 12. While these particular devices are illustrated, video storage system 179 can include a hard drive, flash memory device, computer, DVD burner, or any other device that is capable of generating, storing, decoding and/or displaying the video content of processed video signal 112 in accordance with the methods and systems described in conjunction with the features and functions of the present invention as described herein.

Figure 15:
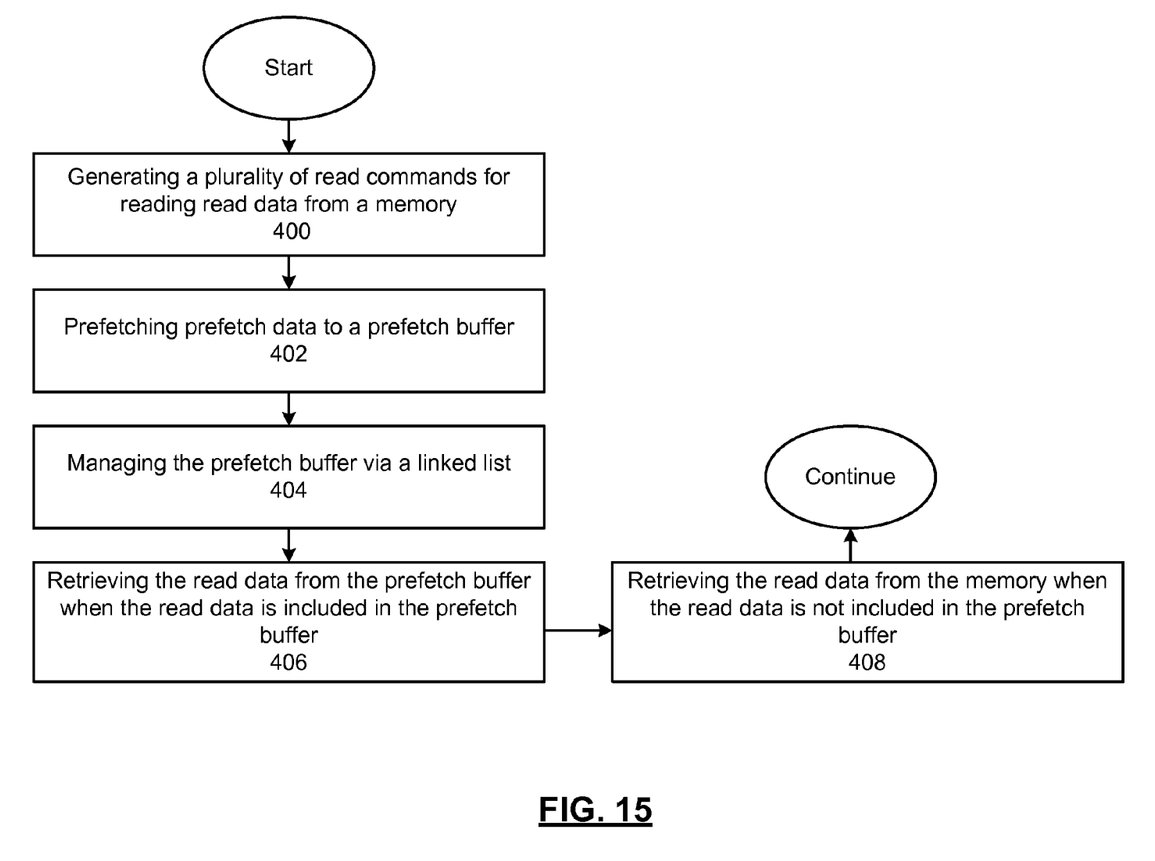
FIG. 15 presents a flowchart representation of a method in accordance with an embodiment of the present invention.

FIG. 15 presents a flowchart representation of a method in accordance with an embodiment of the present invention. In particular, a method is presented for use in conjunction with one or more of the features and functions described in association with FIGS. 1-14. In step 400, a plurality of read commands are generated for reading read data from a memory. In step 402, prefetch data is prefetched to a prefetch buffer. In step 404, the prefetch buffer is managed via a linked list. In step 406, the read data are retrieved from the prefetch buffer when the read data is included in the prefetch buffer. In step 408, the read data are retrieved from the memory when the read data is not included in the prefetch buffer.

In an embodiment of the present invention, the prefetch buffer includes a plurality of entries that are linked via the linked list. These entries can be divided into a set of allocated entries and a set of free entries. These entries can include a status field that indicates a prefetch status of the entry, a linked list pointer that indicates a neighboring entry in the linked list, and/or a tag that indicates the identity of the prefetch data. Step 402 can include selecting the prefetch data based on a programmable prefetch window.

In preferred embodiments, the circuit components of a processing system are implemented using 0.35 micron or smaller CMOS technology. Provided however that other circuit technologies, both integrated or non-integrated, may be used within the broad scope of the present invention.

While particular combinations of various functions and features of the present invention have been expressly described herein, other combinations of these features and functions are possible that are not limited by the particular examples disclosed herein are expressly incorporated in within the scope of the present invention.

As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "coupled As the term module is used in the description of the various embodiments of the present invention, a module includes a functional block that is implemented in hardware, software, and/or firmware that performs one or module functions such as the processing of an input signal to produce an output signal. As used herein, a module may contain submodules that themselves are modules.

Thus, there has been described herein an apparatus and method, as well as several embodiments including a preferred embodiment, for implementing a prefetch memory processing system, video processing device and a video encoder/decoder for use therewith. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A video processing system for producing a processed video signal from a video signal based on video data, the video processing device comprising:
    a memory;
    a processor that generates a plurality of read commands for reading read data from the memory and a plurality of write commands for writing write data to the memory, wherein the read data and the write data include the video data;
    a prefetch memory interface coupled to the processor and the memory, that prefetches prefetch data to a prefetch buffer, that retrieves the read data from the prefetch buffer when the read data is included in the prefetch buffer, and that retrieves the read data from the memory when the read data is not included in the prefetch buffer, wherein the prefetch buffer is managed via a linked list, wherein the prefetch buffer includes a plurality of entries having a status field that selectively indicates an unload pending status, and wherein the prefetch memory interface includes a prefetch request generator that exclusively selects prefetch data during a time period that corresponds to a programmable prefetch window.

2. The video processing system of claim 1 wherein the plurality of entries are linked via the linked list.

3. The video processing system of claim 2 wherein the plurality of entries are divided into a set of allocated entries and a set of free entries.

4. The video processing system of claim 2 wherein each of the plurality of entries includes a linked list pointer that indicates a neighboring entry in the linked list.

5. The video processing system of claim 2 wherein each of the plurality of entries includes a tag that indicates the identity of the prefetch data.

6. A video processing system for processing the video data comprising:
    a memory;
    a processor that generates a plurality of read commands for reading read data from the memory and a plurality of write commands for writing write data to the memory, wherein the read data and the write data include video data;
    a prefetch memory interface coupled to the processor and the memory, that pre fetches pre fetch data to a pre fetch buffer, that retrieves the read data from the pre fetch buffer when the read data is included in the prefetch buffer, and that retrieves the read data from the memory when the read data is not included in the prefetch buffer, wherein the prefetch buffer is managed via a linked list, wherein the prefetch buffer includes a plurality of entries having a status field that selectively indicates an unload pending status, and wherein the prefetch memory interface includes a prefetch request generator that exclusively selects prefetch data during a time period that corresponds to a programmable prefetch window.

7. The video processing system of claim 6 wherein the plurality of entries are linked via the linked list.

8. The video processing system of claim 7 wherein the plurality of entries are divided into a set of allocated entries and a set of free entries.

9. The video processing system of claim 7 wherein each of the plurality of entries includes a linked list pointer that indicates a neighboring entry in the linked list.

10. The video processing system of claim 7 wherein each of the plurality of entries includes a tag that indicates the identity of the prefetch data.

11. A method for processing video data comprising:
    generating a plurality of read commands for reading read data from a memory, wherein the read data and the write data include the video data;
    prefetching prefetch data to a prefetch buffer, wherein the prefetch buffer includes a plurality of entries having a status field that selectively indicates an unload pending status, and wherein prefetching the prefetch data includes selecting prefetch data exclusively during a time period that corresponds to a programmable prefetch window;
    managing the prefetch buffer via a linked list;
    retrieving the read data from the prefetch buffer when the read data is included in the prefetch buffer; and
    retrieving the read data from the memory when the read data is not included in the prefetch buffer.

12. The method of claim 11 wherein the prefetch buffer includes a plurality of entries that are linked via the linked list.

13. The method of claim 12 wherein the plurality of entries are divided into a set of allocated entries and a set of free entries.

14. The method of claim 12 wherein each of the plurality of entries includes a linked list pointer that indicates a neighboring entry in the linked list.

15. The method of claim 12 wherein each of the plurality of entries includes a tag that indicates the identity of the pre fetch data.

16. A video processing device for processing video data comprising:
    a memory;
    a processor that generates a plurality of read commands for reading read data from the memory and a plurality of write commands for writing write data to the memory, wherein the read data and the write data include the video data;
    a prefetch memory interface coupled to the processor and the memory, that prefetches pre fetch data to a pre fetch buffer, that retrieves the read data from the pre fetch buffer when the read data is included in the prefetch buffer, and that retrieves the read data from the memory when the read data is not included in the prefetch buffer, wherein a plurality of entries in the prefetch buffer are managed via state transition among a plurality of entry states, wherein the prefetch buffer includes a plurality of entries having a status field that selectively indicates an unload pending status, and wherein the prefetch memory interface includes a prefetch request generator that exclusively selects prefetch data during a time period that corresponds to a programmable prefetch window.

17. The processing system of claim 16 wherein the pre fetch memory interface includes a tag and buffer server that centrally manages the entries in the prefetch buffer.

18. The processing system of claim 16 wherein each of the status field that indicates one of the plurality of entry states.

19. The processing system of claim 16 wherein the plurality of entries are linked via a linked list.

20. The processing system of claim 19 wherein each of the plurality of entries includes a linked list pointer that indicates a neighboring entry in the linked list.

21. The processing system of claim 16 wherein each of the plurality of entries includes a tag that indicates the identity of the prefetch data.

* * * * *